United States Patent [19]

Barrows

[11] Patent Number: 4,724,107

[45] Date of Patent: Feb. 9, 1988

[54] CONTINUOUS VULCANIZED ASSEMBLY PROCESS AND APPARATUS

[76] Inventor: Brian F. Barrows, 38 Cammo Grove, Barnton, Edinburgh, EH4 8EX, Scotland

[21] Appl. No.: 818,788

[22] Filed: Jan. 14, 1986

[30] Foreign Application Priority Data

Jan. 15, 1985 [GB] United Kingdom ............... 8500987

[51] Int. Cl.[4] .................. B29C 35/02; B29B 13/08
[52] U.S. Cl. .................................. 264/25; 156/87; 156/244.27; 156/244.19; 156/253; 219/121 LM; 264/154; 264/162; 264/171; 264/236; 264/347; 425/113; 425/174.4; 425/225; 425/373
[58] Field of Search .................... 264/174, 25, 162, 26, 264/236, 347, 39, 171, 201, 154; 219/121 LM; 425/113, 114, 225, 327, 328, 373, 384, 174.4; 156/87, 244.12, 244.17, 244.19, 253

[56] References Cited

U.S. PATENT DOCUMENTS

| 1,633,592 | 6/1927 | Hart ...................... 264/347 |
| 2,240,251 | 4/1941 | Baker et al. ............. 425/373 |
| 2,387,335 | 10/1945 | Leonard ................. 264/174 |
| 2,532,080 | 11/1950 | Benbow ................ 425/384 |
| 2,688,581 | 9/1954 | Stubbs .................... 264/171 |
| 3,067,455 | 12/1962 | Reid ...................... 264/171 |

FOREIGN PATENT DOCUMENTS 719630 12/1954 United Kingdom ............... 264/236

*Primary Examiner*—Jeffery Thurlow
*Attorney, Agent, or Firm*—Ratner & Prestia

[57] ABSTRACT

A continuous vulcanized assembly process for producing an anti-fouling material comprises cleaning the surface of a sheet of copper alloy anti-fouling material by shotblasting, use of a rotary abrasive member or by a chemical treatment. A layer of elastomeric material is extruded onto the metallic material and the elastomeric material is then cured at an elevated temperature using a rotary press. The material thus produced can be stored on reels for subsequent attachmnent to appropriate structures.

4 Claims, 1 Drawing Figure

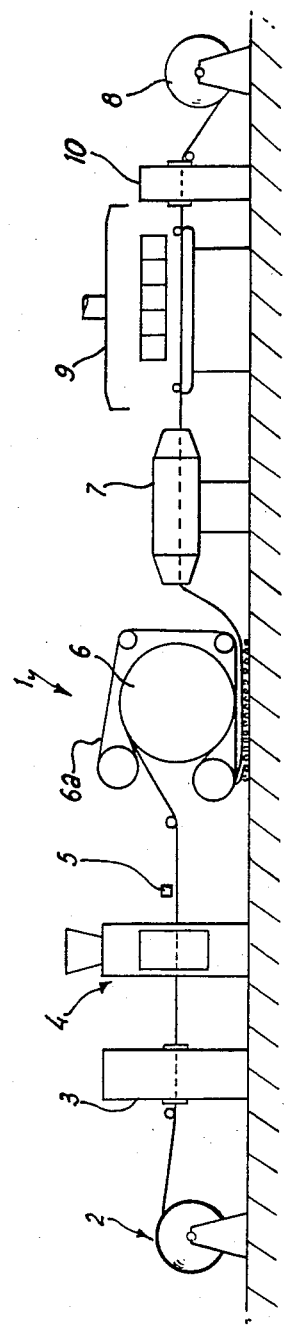

CONTINUOUS VULCANIZED ASSEMBLY PROCESS AND APPARATUS

This invention relates to a continuous vulcanised assembly proocess for producing anti-fouling material.

BACKGROUND OF THE INVENTION

Copper and its alloys have a history of use for anti-fouling dating back a great number of years. This is because copper ions are toxic to many of the marine organisms responsible for fouling. The use of low friction surfaces has also been proposed. These rely on poor adhesion properties to prevent fouling settlement.

BRIEF SUMMARY OF THE INVENTION

It is an object of the present invention to provide a method of and apparatus for producing anti-fouling material suitable for attachment to structures which are to be protected against fouling.

According to the present invention there is provided a continuous vulcanised assembly process for producing an anti-fouling material comprising cleaning the surface of a sheet of metallic anti-fouling material, extruding a layer of elastomeric material onto the metallic material and curing the elastomeric material at an elevated temperature.

Preferably, the metallic material is copper or a copper containing material.

Preferably also, means are provided for cooling the material after curing.

Preferably also, means are provided for regulating the thickness of the layer of elastomeric material.

Preferably also, the metallic material is cleaned by shotblasting or by chemical treatment.

Preferably also, the material is pre-heated by microwave means and may be cured in a rotary press.

Further according to the present invention there is provided apparatus for use in a continuous vulcanised assembly process for producing an anti-fouling material, comprising means for cleaning a sheet of metallic anti-fouling material, means for extruding elastomeric material onto said metallic material and a rotary press for curing the elastomeric material at an elevated temperature.

BRIEF DESCRIPTION OF THE DRAWING

Embodiments of the present invention will now be described, by way of example, with reference to the accompanying drawing which is a schematic representation of apparatus for use in producing anti-fouling material in accordance with the method of the present invention.

DETAILED DESCRIPTION

Referring to the drawing, apparatus of this embodiment of the present invention comprises a production line assembly 1. The production line assembly 1 comprises a copper/nickel strip supply spool 2, a vacublast machine 3, an elastomeric material extruder machine 4, a measuring sensor 5, a rotary curing press 6, a water spray cooling unit 7 and a finished material take-up spool 8.

If desired, a laser micro-perforator 9 and glass nodule cleaner assembly 10 may also be included.

In use, copper/nickel alloy material strip is fed from the supply spool 2 to the vacublast machine 3. This machine cleans the surface of the copper/nickel strip to a bright metal finish free of any loose deposits, chemical contamination or oxidised film. The strip is then fed into the extruder 4 which applies a predetermined thickness of elastomeric material, for example, Hypalon (Trade Mark) to either or both surfaces of the strip. The strip then passes the measuring sensor 5.

The sensor 5 is microprocessor controlled and serves to measure the depth of elastomeric material cover on the surface of the strip and adjusts the rate of feed of the elastomeric material through the extruder 4 to regulate this. The composite elastomeric and alloy strip is then preheated by a microwave heater, not shown, before being fed into the rotary curing press 6.

The rotary curing press 6 has a continuously moving stainless steel band 6a and is heated to approximately 160° C. The curing press 6 consolidates the elastomeric material and produces an impermeable bond together with a polished smooth surface when cured. The curing press 6 ensures that the strip has an even precise coating. This is particularly important if the anti-fouling material produced has to have a permeable or perforated elastomeric surface.

The cured strip is then fed through the water spray cooling unit 7.

The strip may then be fed directly onto the take-up spool 8 or may have further operations carried out on it. In the example illustrated, a perforated membrane product is produced. This is done by passing the cured strip through the laser micro-perforator 9. The micro-perforator 9 produces the precise hole pattern and profile in the elastomer without damaging the copper/nickel alloy surface. The speed at which the strip is fed through the micro-perforator 9 is measured by the microprocessor and the laser travel distance is thereby regulated to maintain a uniform pattern of perforations on the elastomer. The strip is then passed through the glass nodule cleaner assembly 10 which shotblasts the surface of the strip with fine glass nodules to remove the carbonated elastomer produced by the laser perforating process.

The properties of the glass nodules is important since this must not abraid the elastomer surface and must remove the carbonated elastomer without damaging the elastomer to copper/nickel alloy bond.

The anti-fouling material product, whether in perforated or non-perforated form is normally produced in a strip of 76 mm width. The material is thus convenient for winding spirally onto most tubular structures for anti-fouling purposes.

The strip may be passed through a slitter to produce the required edge profile.

In the case of the permeable elastomer product the material may be manufactured as a finished product with the upper permeable elastomer applied at the extruder stage or may be manufactured with no upper section of elastomer, this being applied on site after installation of the product. This allows an even surface, free of any exposed edges which is particularly desirable on ship hulls. These processes do not require to go through the laser perforator. The process can also be used to provide a two layer composite based upon an upper surface of Cu/Ni strip and a lower layer of impermeable elastomer 2 mm in thickness.

Modifications, improvements and various alternative processes may be incorporated without departing from the scope of the invention.

For example, although the method of bonding the elastomeric material and the copper/nickel alloy described above is the preferred method, other methods of bonding are envisaged.

One such bond is produced by the use of chemical bonding agents. An example being a two part metal primer and isocyanate system such as Chemlock 205A and 220. This produces an adequate bond where the metal surface area has been greatly increased as in a shotblasting process. A good mechanical bond is produced by virtue of the increased surface area and such bonding is suitable when there is limited surface cleanliness if accompanied by the greatly increased surface area produced by shotblasting. Such chemical bonding methods may also be used with polychloroprene or neoprene compounds which are not suitable for bonding by the basic method described above.

As an alternative to shotblast cleaning of the metal an abrasive rotating brush or flapper wheel may be used. Such a technique produces a clean cut metal surface and removes a very fine layer of material without creating heat and friction. A suitable system is produced by 3M and comprises a number of flapper wheels consisting of a first stage oscillating wheel which removes an even 5 microns of material thus disposing of all oxidisation, followed by two directional flapper wheels operating at right angles to one another to produce a scored anchor pattern, thus greatly increasing the surface area of the metal. This method produces a more consistent surface standard than the shotblasting technique.

A further method of surface cleaning envisaged is that of chemical etching.

In the methods described above the surface cleaning of the alloy material is carried out immediately prior to the bonding. However, both the shotblast and flapper wheel cleaning techniques may be carried out on the alloy remotely from the bonding process without undue risk of contamination of the prepared surface provided that steps are taken to provide some protection for the cleaned surfaces.

I claim:

1. A continuous vulcanised assembly process for producing an anti fouling material comprising:
   cleaning the surface of a sheet of metallic anti-fouling material;
   extruding a layer of elastomeric material onto the metallic material;
   curing the elastomeric material at an elevated temperature; and
   perforating the layer of elastomeric material to expose a desired proportion of the metallic anti-fouling material.

2. Apparatus for use in a continuous vulcanised assembly process for producing an anti-fouling material comprising;
   means for cleaning a sheet of anti-fouling material;
   means for extruding a layer of elastomeric material onto said metallic material;
   a rotary press for curing the elastomeric material at an elevated temperature; and
   means for perforating the layer of elastomeric material to expose a desired proportion of the metallic antifouling material.

3. Apparatus as claimed in claim 2, wherein the means for perforating the layer of elastomeric material comprises laser micro-perforation apparatus 4. Apparatus as claimed in claim 3 wherein there is further included glass nodule shotblasting apparatus to remove carbonated elastomeric produced by the laser micro-perforation apparatus.

* * * * *